US009864408B2

(12) United States Patent
Risher-Kelly et al.

(10) Patent No.: US 9,864,408 B2
(45) Date of Patent: Jan. 9, 2018

(54) ELECTRONIC LOCKING MECHANISM FOR A DOCKING STATION

(71) Applicant: Draeger Medical Systems, Inc., Andover, MA (US)

(72) Inventors: Clifford Mark Risher-Kelly, Wells, ME (US); Bernd Rosenfeldt, Hamilton, MA (US)

(73) Assignee: Draeger Medical Systems, Inc., Andover, MA (US)

( * ) Notice: Subject to any disclaimer, the term of this patent is extended or adjusted under 35 U.S.C. 154(b) by 231 days.

(21) Appl. No.: 14/784,280

(22) PCT Filed: Apr. 15, 2013

(86) PCT No.: PCT/US2013/036604
§ 371 (c)(1),
(2) Date: Oct. 13, 2015

(87) PCT Pub. No.: WO2014/171917
PCT Pub. Date: Oct. 23, 2014

(65) Prior Publication Data
US 2016/0062403 A1  Mar. 3, 2016
US 2016/0259372 A2  Sep. 8, 2016

(51) Int. Cl.
G06F 1/00   (2006.01)
G06F 1/16   (2006.01)
G06F 1/32   (2006.01)
G06F 13/40  (2006.01)

(52) U.S. Cl.
CPC .......... *G06F 1/1632* (2013.01); *G06F 1/3231* (2013.01); *G06F 13/409* (2013.01); *G06F 13/4081* (2013.01)

(58) Field of Classification Search
None
See application file for complete search history.

(56) References Cited

U.S. PATENT DOCUMENTS

| 5,959,287 A | 9/1999 | Myers et al. |
| 7,316,648 B2 * | 1/2008 | Kelly ................. G06F 19/3418 128/903 |
| 8,952,774 B2 * | 2/2015 | Dolgonos ............... F28F 9/007 165/67 |
| 9,079,524 B2 * | 7/2015 | Aucoin ................ A61G 3/0808 |
| 2010/0060410 A1 | 3/2010 | Wirth |

FOREIGN PATENT DOCUMENTS

WO    2007010484 A2    1/2007

* cited by examiner

Primary Examiner — Cheng-Yuan Tseng
(74) Attorney, Agent, or Firm — Jones Day

(57) ABSTRACT

A docking station for a patient monitoring device and method of locking the patient monitoring device in the docking station is provided. A housing selectively supports a patient monitoring device thereon and a first port positioned on the housing receives a patient monitoring device therein. A sensor senses one of a presence and absence of the patient monitoring device within the first port. A locking mechanism mechanically locks the patient monitoring device within the first port, wherein the locking mechanism maintains the docking station and patient monitoring device in a mechanically locked state in response to sensing the presence of the patient monitoring device within the first port.

32 Claims, 8 Drawing Sheets

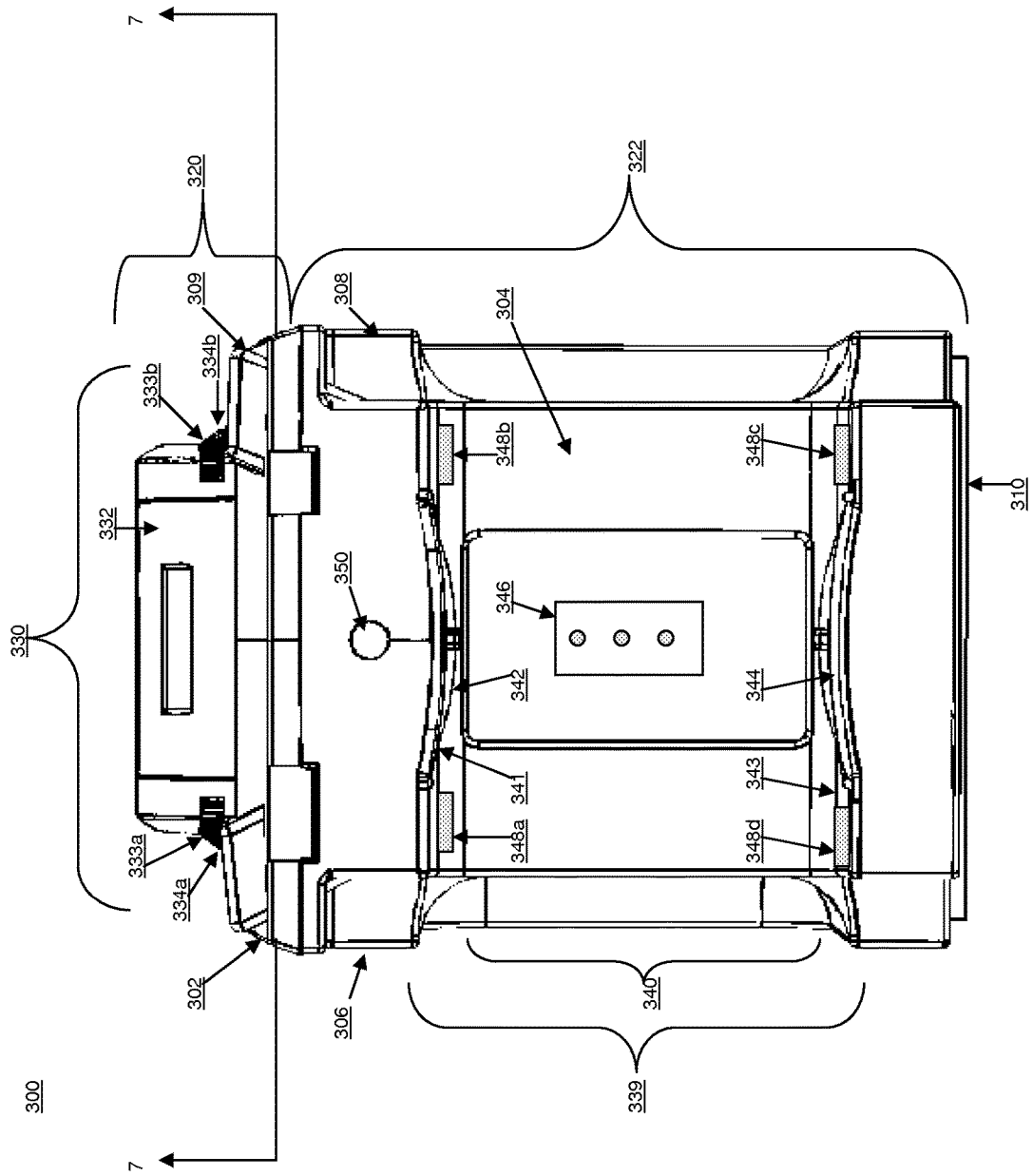

ELECTRONIC LOCKING MECHANISM FOR A DOCKING STATION

The present application is a 371 of International Application No. PCT/US2013/036604, filed Apr. 15, 2013, the entirety of which is incorporated herein by reference.

FIELD OF THE INVENTION

The present invention relates to a docking station that receives at least one type of patient monitoring device therein, and more specifically, to a locking mechanism that enables one handed placement and removal of the monitor on the docking station.

BACKGROUND OF THE INVENTION

During the course of providing healthcare to patients, practitioners typically connect at least one type of sensor to a patient to sense, derive and otherwise monitor at least one type of patient medical parameter. These patient connected sensors are further connected to a monitoring device that includes all relevant electronic components that enable conversion, manipulation and processing of the data sensed by the at least one type of sensor in order to generate the patient medical parameter. These patient medical parameters are usable by healthcare practitioners (e.g. nurses, doctors, physician assistants, or any other person charged with providing a healthcare service to a patient) in monitoring a patient and determining a course of healthcare to be provided to the patient.

Patient monitoring devices may be selectively connected to the patients at any point during which a healthcare professional comes into contact with the patient and thus may remain connected with the patient as the patient moves through various locations within a particular healthcare enterprise (e.g. hospital) or between different healthcare enterprises (e.g. different medical facilities). Once it is determined that a patient is to remain in a fixed location, the patient monitoring devices are selectively connected (docked) to a docking station that may serve as a gateway for connecting the patient monitoring device to a hospital information system (HIS) and/or central monitoring station and allowing data representing the at least one patient medical parameter to be communicated to other systems within the healthcare enterprise. This data may then be used by different systems in further patient care.

Once docked it is imperative to ensure that the patient monitoring device remains securely connected to the docking station. Secure connection of the patient monitor with the docking station protects against inadvertent displacement or disconnection thereof resulting in injury to a patient or healthcare professional or damage to the monitor. Further, the secure connection of the patient monitoring device with the docking station maintains an electronic connection between the docking station and the various other information systems. However, it is also necessary for the patient monitoring device to be removed to allow the patient to move between various care units. A drawback associated with the locking and removal of conventional patient monitoring devices is requiring two handed operation to complete both actions. This may result in delaying the movement of the patient which may negatively impact the health of the patient. A further drawback associated with the locking and removal of convention patient monitoring devices using a two-handed release is that the healthcare professional is prevented from using the second hand for other duties because it is needed to remove and disconnect the monitoring device from the docking station. An apparatus and method of operating the apparatus according to invention principles addresses deficiencies of known docking station locking mechanisms.

SUMMARY OF THE INVENTION

In one embodiment, a docking station for a patient monitoring device is provided. A housing selectively supports a patient monitoring device thereon and a first port positioned on the housing receives a patient monitoring device therein. A sensor senses one of a presence and absence of the patient monitoring. A locking mechanism mechanically locks the patient monitoring device within the first port, wherein the locking mechanism maintains the docking station and patient monitoring device in a mechanically locked state in response to sensing the presence of the patient monitoring device within the first port.

In another embodiment, a connector positioned within the first port mates with a corresponding patient monitoring device connector enabling the patient monitoring device to receive power from the docking station and communicate data between the docking station and the patient monitoring device when the locking mechanism locks the patient monitoring device within the first port.

In a further embodiment, a method of securing a patient monitoring device within a docking station is provided. The method includes receiving a patient monitoring device within a first port on a housing of the docking station and sensing, by a sensor, one of a presence and absence of the patient monitoring device. The method further provides for mechanically locking the patient monitoring device within the first port using a locking mechanism and maintaining the docking station and patient monitoring device in a mechanically locked state in response to sensing the presence of the patient monitoring device within the first port.

In another embodiment, the method includes connecting a connector positioned within the first port a corresponding patient monitoring device connector enabling the patient monitoring device to receive power from the docking station and communicate data between the docking station and the patient monitoring device when the locking mechanism locks the patient monitoring device within the first port.

BRIEF DESCRIPTION OF THE DRAWING FIGURES

FIG. 3 is a front view of an exemplary docking station including the electronic locking mechanism according to invention principles;

Figure 5:
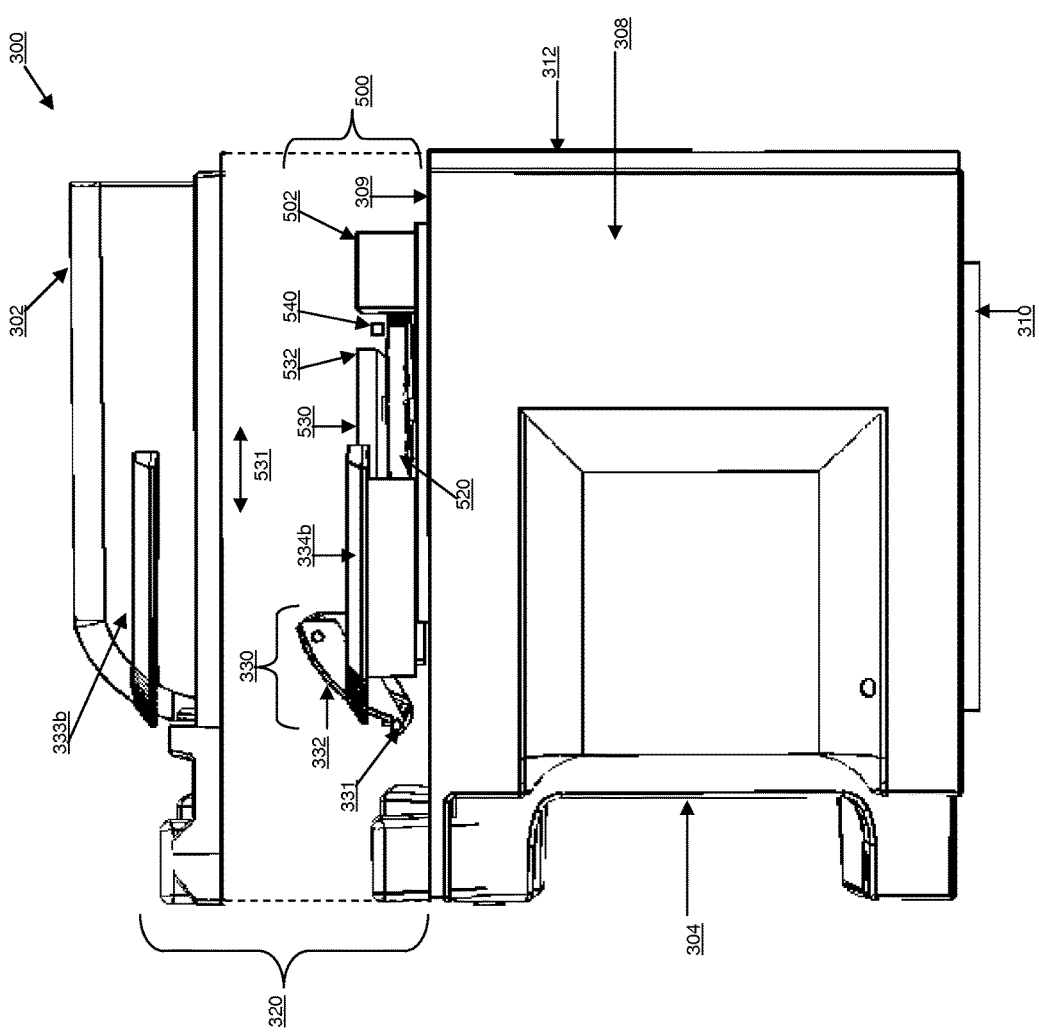
Figure 6:
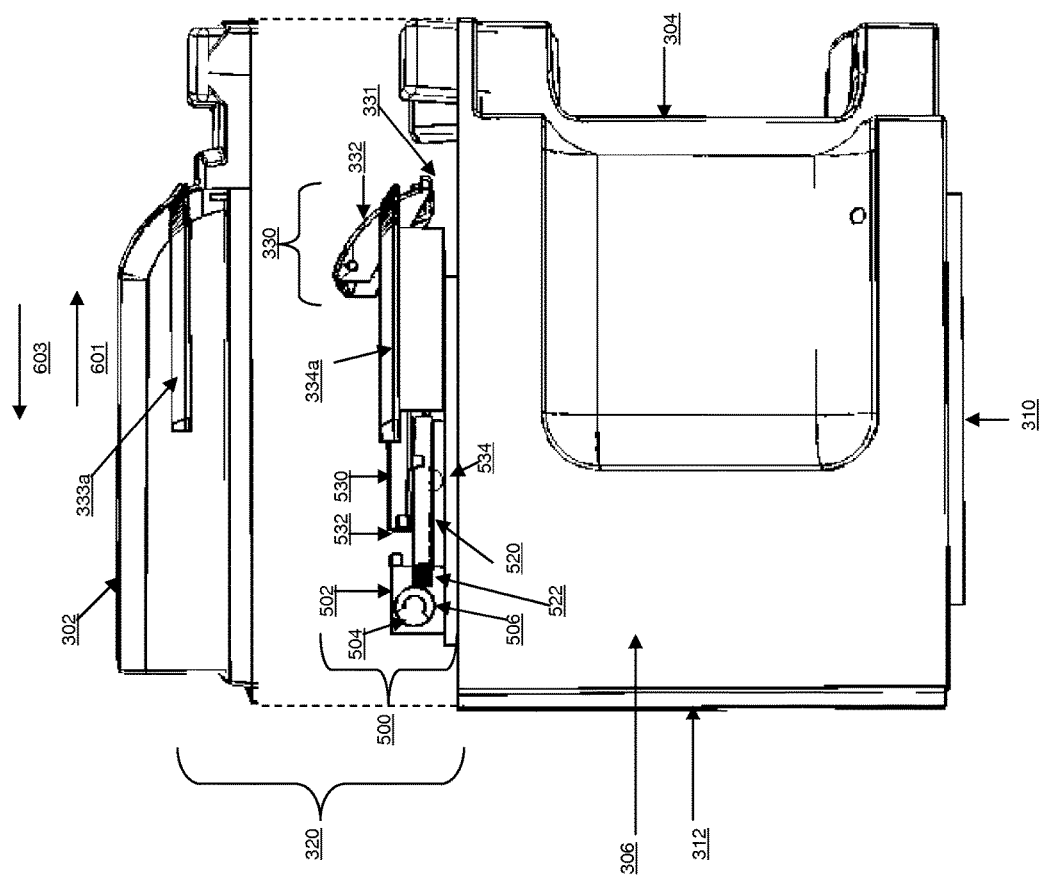
Figure 7:
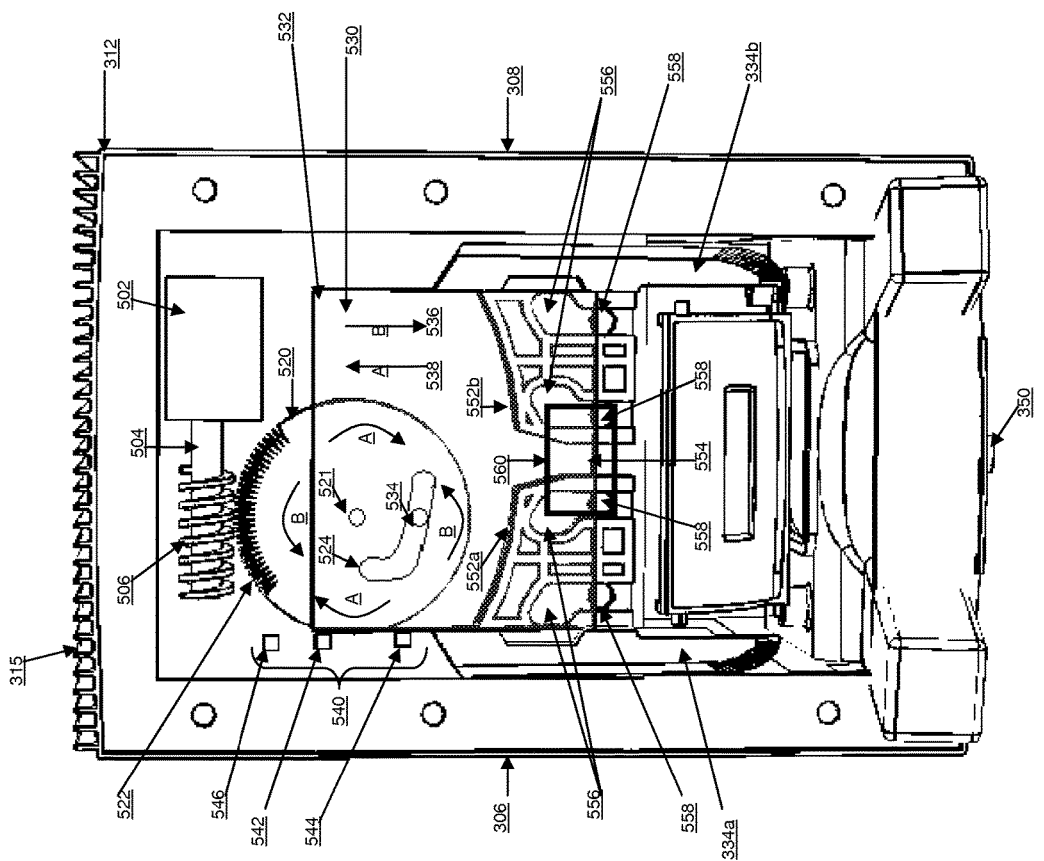

FIG. 5 is a right side exploded view of an exemplary docking station including the electronic locking mechanism according to invention principles; and FIG. 6 is a left side exploded view of an exemplary docking station including the electronic locking mechanism according to invention principles; and FIG. 7 is a top cross sectional view taken along the line labeled 7-7 in FIG. 3 detailing an exemplary electronic locking mechanism according to invention principles.

DETAILED DESCRIPTION OF THE INVENTION

In accordance with invention principles, a docking station for receiving a patient monitoring device and having an electronic locking mechanism is provided. The electronic locking mechanism includes a first locking stage and a second locking stage. The first and second locking stages represent the operation of the locking mechanism as it interacts with and engages the patient monitoring device. During the first locking stage, the locking mechanism mechanically secures a patient monitoring device to the docking station. Thus, the patient monitoring device is in a mechanically locked state. During the second locking stage, the locking mechanism is electronically controlled to maintain the mechanical connection between the patient monitoring device and the docking station and establish a connection between the patient monitoring device and the docking station that enables bidirectional transfer of data between the patient monitoring device and the docking station as well as transfer of power from the docking station to the patient monitoring device. During the second locking stage, the locking mechanism maintains the patient monitoring device in a mechanically locked state.

The electronic locking mechanism is automatically engaged during the second locking stage in response to detecting the presence of the patient monitoring device positioned on the docking station. During the second locking stage the connection of the patient monitoring device with the docking station is fortified by maintaining the mechanical connection formed during the first locking stage in a locked position and preventing disengagement of the patient monitoring device from the docking station. This advantageously ensures that the patient monitoring device remains secured in position to prevent inadvertent dislodging of the patient monitoring device from the docking station. Electronic engagement of the locking mechanism during the second locking stage further advantageously establishes an electrical connection between the patient monitoring device and the docking station thereby allowing electrical signals to be communicated therebetween.

The electronic locking mechanism is selectively controlled by input signals received from at least two sensors. A first sensor selectively senses a position of the patient monitoring device on the docking station. In response to sensing that the patient monitoring device is positioned on the docking station, the electronic locking mechanism is controlled to automatically enter the second locking stage and maintain the mechanical connection between the docking station and patient monitoring device established during the first locking stage. Further, during the second locking stage, the electronic locking mechanism simultaneously establishes a connection enabling signal transmission between the patient monitoring device and the docking station. Movement and operation of the electronic locking mechanism during the second locking stage is responsive to signals sensed by a second sensor. The second sensor senses a position of the locking mechanism and, based on the sensed position, controls the locking mechanism to one of (a) maintain the mechanical connection and establish the electrical connection between the patient monitoring device and docking station or (b) disconnect the patient monitoring device from the docking station by disconnecting the electrical connection and disengaging the mechanical connection made by the locking mechanism between the patient monitoring device from the docking station.

Prior to a patient monitoring device being positioned on the docking station, the locking mechanism is in a first idle position. In the first idle position, a mechanical securing member of the locking mechanism is engaged as in the case during the first locking stage. When a user positions the patient monitoring device on the docking station, the patient monitoring device causes the mechanical securing member to be temporarily disengaged allowing the patient monitoring device to be positioned on the docking station. Once positioned thereon, the mechanical securing member is re-engaged such that the mechanical securing member mates with a corresponding track of the patient monitoring device thereby securing the patient monitoring device to the docking station and the patient monitoring device is in a mechanically locked state.

The first sensor, sensing that the patient monitoring device is positioned on the docking station, provides an input signal initiating the second locking stage. During the second locking stage, the locking mechanism fortifies the mechanical securing member within the track of the patient monitoring device by preventing any disengagement of the mechanical securing member from the patient monitoring device caused by any movement of the patient monitoring device. Thus, the locking mechanism maintains the mechanical securing member (and patient monitoring device) in the mechanically locked state. During the second locking stage, the locking mechanism simultaneously engages and establishes the electrical connection between the patient monitoring device and the docking stage. To establish this connection, the electronic locking mechanism is moved from a first idle position to a second locked position. In response to the second sensor detecting that the locking mechanism has reached the second locked position, the operation of the locking mechanism is ceased and the connection is maintained. Thus, the second sensor advantageously continuously monitors movement and position of the locking mechanism to control when the patient monitoring device is locked in place and the electrical connection is established. Thus, overexertion and subsequent wear and tear associated with operation of the locking mechanism is prevented. Furthermore, the automatic engagement and operation of the electronic locking mechanism advantageously enables a user to secure and electrically connect the patient monitoring device with the docking station using one hand because the locking mechanism is automatically engaged upon detecting the presence of the patient monitoring device.

Similarly, the electronic locking mechanism also advantageously enables a user to dislodge the patient monitoring device using a one handed operation. Instead of using a second hand to mechanically unlock the patient monitoring device and brace the docking station when removing the patient monitoring device as done conventionally, the novel locking mechanism advantageously enables placement and removal of the patient monitoring device from the docking station using a single hand.

To effect the single-handed removal operation, the electronic locking mechanism is responsive to an unlock signal input generated in response to user activation of an unlock signal generator. The unlock signal initiates a timed unlocking process. In response to initiating the unlocking process via activation of the unlock signal generator, the first locking stage is reinitiated causing the electronic locking mechanism to move from the second locked position to the first idle position. Thus, the locking mechanism is partially disengaged during the re-initiation of the first locking stage. Thereafter, if a change in position of the patient monitoring device is detected by the first sensor within the predetermined time period, the electronic locking mechanism is caused to enter an unlock stage whereby the locking mechanism moves from the first idle position to a third unlock position, fully disengaging the mechanical securing member from the track on the patient monitoring device and allowing for removal of the patient monitoring device from the docking station using one hand. If no change in position of the patient monitoring device is detected by the first sensor during the predetermined time period, the electronic locking mechanism automatically reinitiates the second locking stage and moves back into the second locked position from the first idle position. By using a timed unlocking process responsive to input signals sensed by the first sensor and control of the locking mechanism via the second sensors, the patient monitoring device remains in place until such time that the docking station detects and determines that a user intentionally wants to remove the patient monitoring device from the docking station. This intelligent electronic locking mechanism advantageously ensures that the patient monitoring device remains in a secured position while the intentions of the user with respect to dislodging the device are determined. Thus, in the event of an erroneously input unlocking signal, the patient monitoring device is not automatically and immediately unlocked. Rather, the electronic locking mechanism in the docking station maintains the monitoring device in a semi-secured state via the mechanical connection with the docking station until such time that it senses a definite intention by the user to dislodge (or remove) the patient monitoring device from the docking station.

In another embodiment, the docking station may include a second dock able to selectively receive a second patient monitoring device that is different from the patient monitoring device discussed above. In this embodiment, the electronic locking mechanism may also operate to lock and unlock the second patient monitoring device to the docking station in a similar manner.

In a further extension of the embodiment of the docking station able to receive two different types of patient monitoring devices, a second locking mechanism different from the first locking mechanism that selectively locks and unlocks the second type of patient monitoring device may be provided. This embodiment may include sensors that are able to sense positioning and movement of each respective patient monitoring device docked therein as well as sensors for controlling the movement and operation of the respective first and second locking mechanisms to facilitate the locking and unlocking of each patient monitoring device as discussed above.

Turning now to the drawings, in which similar reference characters denote similar elements throughout the several views, FIGS. 1 through 8 illustrate an embodiment of the present invention.

Figure 1:
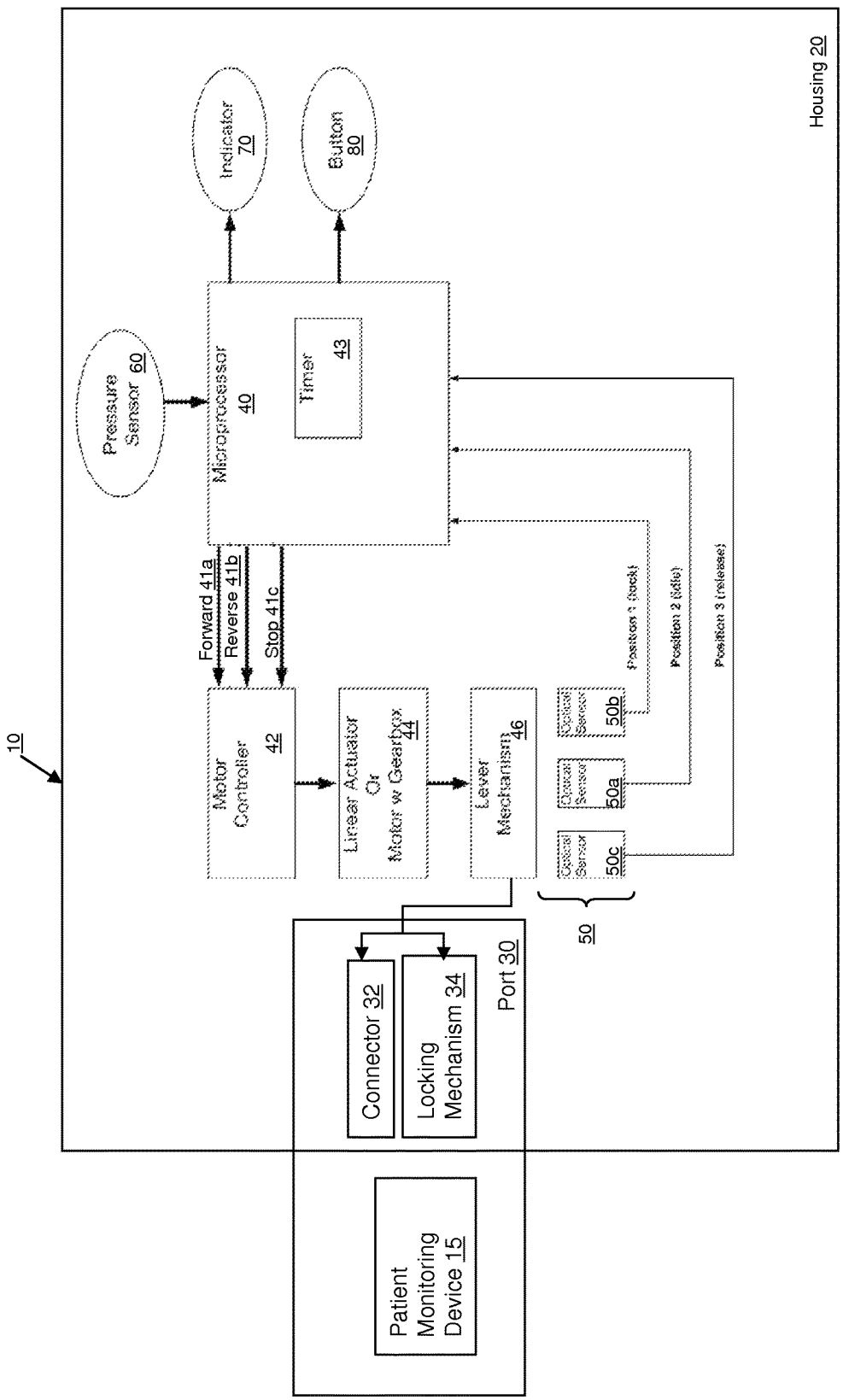
FIG. 1 is an exemplary block diagram of the electronic locking mechanism according to invention principles.

A block diagram of a docking station according to invention principles is provided in FIG. 1. FIG. 1 includes components of the docking station and the electronic locking mechanism and outlines the operational principles thereof. The docking station 10 may selectively receive at least one type of patient monitoring device 15. The docking station 10 is any apparatus that may be selectively positioned at a fixed location within a healthcare enterprise. In one example, the docking station 10 may be located at a patient's bedside and facilitates a connection between a patient monitoring device 15 and a plurality of hospital information systems to allow data from the patient monitoring device 15 to be provided to various computing systems located locally within the healthcare enterprise or remotely from the healthcare enterprise. The docking station 10 may be formed in any shape or size sufficient to support and secure a patient monitoring device 15 thereto and facilitate an electrical connection between the docking station 10 and patient monitoring device 15. A patient monitoring device 15 may represent any apparatus that is selectively connectable to a patient for sensing at least one type of signal from the patient and using the sensed signal(s) to determine and monitor at least one type of patient medical parameter associated with the patient which may be used in providing healthcare to the patient.

The docking station 10 includes a housing 20 having at least one port 30 for selectively receiving at least one type of patient monitoring device 15 therein. While FIG. 1 shows only a single port, the docking station 10 may include additional ports for receiving additional patient monitoring devices 15 of the same or different types. The port 30 includes a connector 32 that establishes a connection between the docking station 10 and the patient monitoring device 15 thereby allowing signals to be communicated therebetween. Signal communication may include bidirectional data transfer between the patient monitoring device and docking station as well as the providing power from the docking station to the patient monitoring device. The connector 32 may be any type of connector including but not limited to (a) a pin connector comprising at least one pin; (b) electrical contacts; (c) an optical connection; and (d) a magnetic connector. The connector 32 enables at least one of (a) data transfer between the patient monitoring device and the docking station; and (b) providing of power to the patient monitoring device from the docking station. The port 30 also include a lock 34 for releasably locking the patient monitoring device 15 docked at port 30 to the docking station 10. The lock 34 may be a two stage lock wherein each stage is entered at a different point in the locking process.

During a first locking stage, a mechanical locking mechanism that mates with a corresponding portion (e.g. track, receptacle or the like) of the patient monitoring device 15 is engaged. The second locking stage may include activation of an electromechanical locking operation whereby a motor or other actuator is used to re-position the mechanical locking mechanism such that the mechanical lock engaged during the first stage is maintained and cannot be disengaged. The electromechanical operation during the second locking stage may further selectively connect the connecter 32 with a corresponding connector on the patient monitoring device 15 to enable signal transfer therebetween.

In one embodiment, the mechanical locking mechanism may include a set of arms that are biased against one another to remain at rest in a first locked position. The bias force applied to the arms may be overcome by a force exerted thereon by a patient monitoring device when connecting the patient monitoring device 15 to the port 30. In this embodiment, once the patient monitoring device 15 is seated within the port 30, the bias force applied to the arms cause the arms to be received within a track on the patient monitoring device 15 resulting the arms being maintained in its biased position within the track and at least partially locking the patient monitoring device 15 in place. This re-application of the bias force to the arms occurs during the first locking stage and provides enough force to secure the patient monitoring device and prevent it from being dislodged by inadvertent contact therewith. In this embodiment, during the second locking stage, a further force is applied to the arms to prevent the bias force applied to the arms from being overcome. During the second locking stage, the connector 32 is simultaneously caused to contact the corresponding connector on the patient monitoring device thereby establishing a connection therebetween.

Operation of the locking mechanism as discussed above will now be further described. The docking station 10 includes a microprocessor 40 for executing instructions that control the operation of the locking mechanism. The microprocessor 40 may also be a controller. A first type of sensor 60 is coupled to the microprocessor 40. The first type of sensor 60 senses a presence of the patient monitoring device 15 docked in the port 30 of the docking station. The first type of sensor 60 may be positioned on the housing 20 at a location proximate to the port 30 such that the first type of sensor 60 detects when a patient monitoring device 15 is docked in the port. In one embodiment, the first type of sensor 60 is a pressure sensor that selectively senses an amount of downward force applied by the patient monitoring device 15 thereto. The downward force applied to the pressure sensor 60 is due to the weight of the patient monitoring device 15. For example, when the patient monitoring device 15 is received within the port 30, the patient monitoring device 15 exerts a downward force on the housing 20 of the docking station 10. The first type of sensor (e.g. pressure sensor) senses the downward force exerted by the patient monitoring device 15 on the docking station housing 20. A signal representative of a sensed downward force is received by the microprocessor 40 and evaluated against a force threshold value to determine if the sensed force reaches or exceeds the force threshold. If the sensed force reaches or exceeds the force threshold value, the microprocessor 40 determines that a patient monitoring device 15 is present and initiates a state change algorithm that changes the locking state of the locking mechanism. By changing the locking state, the locking mechanism is caused to enter the second locking stage to securely lock the patient monitoring device 15 within the port and establish a connection between the patient monitoring device 15 and docking station 10 to allow for data transfer to occur. The first type of sensor 60 also uses the sensed amount of downward force exerted on the housing 20 by the patient monitoring device 15 to unlock and allow for removal of the patient monitoring device 15 from the docking station 10. In general operation, the first type of sensor 60 may also detect a change in the amount of downward force exerted by the patient monitoring device 15 on the first type of sensor 60 within the housing 20. If the first type of sensor 60 detects a reduction in the amount of force exerted on the housing 20, the microprocessor 40 may enable the disconnection of the patient monitoring device 15 from the docking station 10. Further details regarding the operation of the locking and unlocking operation will be discussed below.

The microprocessor 40 may be electrically coupled to a motor controller 42 to control an actuator 44 that operates the locking mechanism 34 via a lever mechanism 46. The microprocessor 40 generates motor control signals, referred to collectively with reference numeral 41, for controlling the operation of the motor controller 42 in moving the actuator 44. The actuator 44 may be one of (a) a linear actuator; (b) a caterpillar motor; or (c) a motor with a gearbox. These actuators are described for purposes of example only and any actuator capable of controlling the locking mechanism 34 in the manner described herein may be implemented. The actuator 44 includes a lever mechanism 46 connected thereto. The lever mechanism 46 is connected to the lock 34. The lever mechanism 46 controls the movement of the lock 34 and provides positional information representing a state associated with the lock 34. For example, the state associated with the lock may include one of (a) an idle state; (b) a locked state; and (c) an unlocked state. The motor controller 42 may receive, from the microprocessor 40, a motor control signal 41. The motor control signal 41 may be indicative of a direction in which the actuator 44 is to move the lever mechanism 46. The motor control signal 41 may also be a stop signal which causes the actuator 44 to stop operating. Motor control signal 41a indicates that the actuator 44 is able to move the lever mechanism 46 in a forward direction towards the patient monitoring device 15 connected via the port 30. Motor control signal 41b indicates that the actuator 44 is to move the lever mechanism 46 in a reverse direction, e.g. away from the patient monitoring device 15 connected via the port 30. Motor control signal 41c directs the actuator 44 to cease operation and no longer move the lever mechanism 46 in any direction.

The actuator 44 may selectively move the lever mechanism 46 between three positions wherein each position is associated with a state of the lock 34. The position of the lever mechanism 46 is selectively determined by a set of sensors, collectively referred to with reference numeral 50. Each sensor of the set of sensors 50 are positioned at various locations within the housing 20 and along a path over which the lever mechanism 46 may traverse. In one embodiment, the lever mechanism 46 may move linearly within the housing 20 and the set of sensors 50 may be positioned at predetermined positions along that linear path to determine a position of the lever mechanism 46. The set of sensors 50 may include a first sensor 50a that, in response to sensing the position of the lever mechanism 46 is substantially aligned therewith, determines that the lever mechanism 46 is in a first idle position. A second sensor 50b, in response to sensing the lever mechanism 46 is substantially aligned therewith, determines that lever mechanism is in a second locked position. A third sensor 50c, in response to sensing the lever mechanism 46 is substantially aligned therewith, determines that the lever mechanism 46 is in a third unlocked position. The set of sensors 50 are electrically coupled to the microprocessor 40 and provide data representing the position of the lever mechanism 46 thereto. The microprocessor 40 may use this data to generate motor control signals 41 for selectively controlling the motor controller 42. By using the feedback signals sensed by sensors 50, the microprocessor 40 may advantageously precisely control the operation of the motor controller 42 based on the specific position of the lever mechanism 46 thereby preventing overuse of the motor. Moreover, this feedback control advantageously enables the microprocessor 40 to control the motor controller 42 to ensure that the actuator 44 remains in its current position and that the locking mechanism 34 remains in the desired locking state.

The docking station 10 further includes an indicator 70 positioned on the housing 20. The indictor 70 is coupled to the microprocessor 40 and indicates, to a user, the current state of the locking mechanism as determined by the set of sensors 50 and the position of the lever mechanism 46. In response to the microprocessor 40 receiving a signal from the first sensor 50a, the microprocessor 40 controls the indicator 70 to provide a first type of indication representing the locking mechanism 34 is in the first idle state. The microprocessor 40 further controls the indicator 70 to provide a second type of indication representing the locking mechanism 34 is in the second locked state when the second sensor 50b senses that the lever mechanism 46 is substantially aligned therewith. The indicator 70 is further controlled by the microprocessor 40 to provide a third type of indication indicating that the locking mechanism 34 is in a third unlocked state when the third sensor 50 senses that the lever mechanism 46 is substantially aligned therewith. The indicator 70 may be at least one of (a) a visual indicator; (b) an audible indicator; or (c) an audiovisual indicator. In one embodiment, the indicator 70 may be an LED that is selectively illuminated in at least three different colors wherein each color represents a respective state of the locking mechanism.

A state change button 80 is also positioned on the housing 20 of the docking station 10. The state change button 80 enables a user to initiate a change in state of the locking mechanism 34. In response to detecting user interaction with the state change button 80, the microprocessor 40 is selectively controlled to initiate a change in state of the locking mechanism 34. In one embodiment, the state change button 80 enables the user to selectively unlock and undock the patient monitoring device 15 from the docking station. As the locking mechanism 34 is electrically controlled, activating the state change button 80 allows a user to unlock and undock the patient monitoring device 15 from the docking station using only one hand.

In another embodiment, the operation of changing the state of the locking mechanism 34 may occur by receiving a stage change signal generated by the patient monitoring device connected to the docking station. For example, the state change button may be present on the housing of the patient monitoring device connected to the docking station 10. Alternatively, the state change button may be implemented as a soft key selectively displayed on a display screen of the patient monitoring device. In any of these instances, activation of a stage change results in the patient monitoring device generating a state change signal which is received by the microprocessor 40 in the docking station 10.

In operation, where the state change represents a change from a locked state to an unlocked state, a user initiates the change in state by selectively activating the state change button 80. In response to activation of the state change button 80, a timer 43 is initiated providing the user with a predetermine amount of time to remove the patient monitoring device and thus confirm whether the indicated state change was intentional. This timed state change process advantageously prevents automatic release of the locking mechanism which may result in injury to one of the patient or healthcare professional as well as prevents damage to the patient monitoring device. Upon initiation of the timer 43, the microprocessor 40 monitors data sensed by the position sensor 60 to determine if there is a change in the position of the patient monitoring device 15 on the docking station 10. In one embodiment, the change in position may be indicated by movement of the patient monitoring device 15 off of the housing 20 on which it is positioned. In another embodiment, where the position sensor 60 is a pressure sensor, the change in position may be indicated by detecting a reduction in an amount of downward force exerted on the position sensor 60 (or housing 20) indicating the user wishes to unlock and undock the patient monitoring device 15 from the docking station 10. In response to the position sensor 60 detecting a change in presence of the patient monitoring device 15, the microprocessor 40 generates motor control signal 41*b* indicating that the motor controller 42 should cause the actuator 44 to move the lever mechanism 46 in a direction away from patient monitoring device 15 and into the third unlock position. By moving the lever mechanism 46 into the third unlock position, the locking mechanism 34 exits first and second locking stages and enters a third unlocked stage. Once in the third unlocked stage, a user may remove the patient monitoring device using only a single hand. In contrast, if the position sensor 60 fails to detect a change in presence (e.g. by sensing a change in pressure), the microprocessor 40 the locking mechanism 34 remains in the first locking stage.

In a further embodiment, activating the state change button 80 to change the state of the locking mechanism 34 from a locked state to an unlocked state may occur as follows. The timer 43 is initiated in response to selection of the state change button 80 and the microprocessor 40 generates a motor control signal 41*c* to cause the motor controller 42 to move the actuator 44 in a direction away from the patient monitoring device 15 such that the lever mechanism 46 is moved from the second locked position into the first idle position resulting in the locking mechanism exiting the second locking stage and entering the first locking stage. Upon detecting, by the second sensor 50*b*, that the lever mechanism 46 is in the first idle position, the microprocessor 40 generates a motor control signal 41*c* causing the motor controller to stop movement by the actuator 44. Once in the first idle position, the locking mechanism re-enters the first locking stage and the patient monitoring device is locked in place via the mechanical connection. The microprocessor 40 simultaneously receives data from the sensor 60 to determine if a change in position is detected, for example, by sensing a reduction in an amount of downward force being exerted by the patient monitoring device on the position sensor 60. Upon detecting a change in presence of the patient monitoring device 15, the microprocessor 40 generates a motor control signal 41*b* indicating that the motor controller 42 should cause the actuator 44 to move the lever mechanism 46 from the first idle position to the third unlocked position and initiate the third unlocked stage wherein the mechanical connection between the docking station and the patient monitoring device is disengaged. This allows the patient monitoring device 15 to be removed from the docking station by one hand. The third sensor 50*c* detects that the lever mechanism 46 has reached the third unlocked position and signals the microprocessor 40 to generate the motor control signal 41*c* indicating that movement of the actuator 44 should cease. Once removed, the position sensor 60 detects that no force is being exerted thereon causing the microprocessor 40 to generate a motor control signal 41*a* indicating that the motor controller 42 should control the actuator 44 to move the lever mechanism 46 from the third unlocked position to the first idle position and enter the first locking stage wherein the docking station 10 may receive another patient monitoring device thereon.

The block diagram of FIG. 1 is described as being able to selectively receive a patient monitoring device 15 in the port 30. However, this is described for purpose of example only. The docking station 10 may further include a second port for receiving a second type of patient monitoring device therein. In this embodiment, a second connector for establishing a connection between the patient monitoring device and the docking station may be provided. Additionally, a second locking mechanism may also be provided. The second locking mechanism may be controlled by the same actuator 44 and motor controller 42 as the first locking mechanism described above. Alternatively, the second locking mechanism may have its own motor controller, actuator, lever and sensors associated therewith. In this embodiment, the microprocessor 40 selectively controls the operation of any components in common between the first and second patient monitoring devices and locking mechanism. The microprocessor 40 also controls any components that are unique to each of the first and second patient monitoring devices and respective locking mechanism.

In an embodiment where the docking station 10 may receive two different types of patient monitoring devices, the state change button 80 may allow the microprocessor 40 to prepare one or both patient monitoring devices and respective locking mechanisms to change from a locked state to an unlocked state. In this embodiment, the microprocessor 40 may be responsive to sensors that are specific to the respective patient monitoring device that is sought to be unlocked and undocked. Thus, upon detecting a change in state is desired for the first patient monitoring device, the state change algorithm is executed with respect to only the first patient monitoring device and first locking mechanism while the second locking mechanism associated with the second patient monitoring device is maintained in its current locked state.

In another embodiment, where the docking station 10 may receive two different types of patient monitoring devices, the housing 20 may include two state change buttons 80 each associated with a respective patient monitoring device thereby ensuring that the unlocking and undocking process is initiated individually.

Figure 2A:
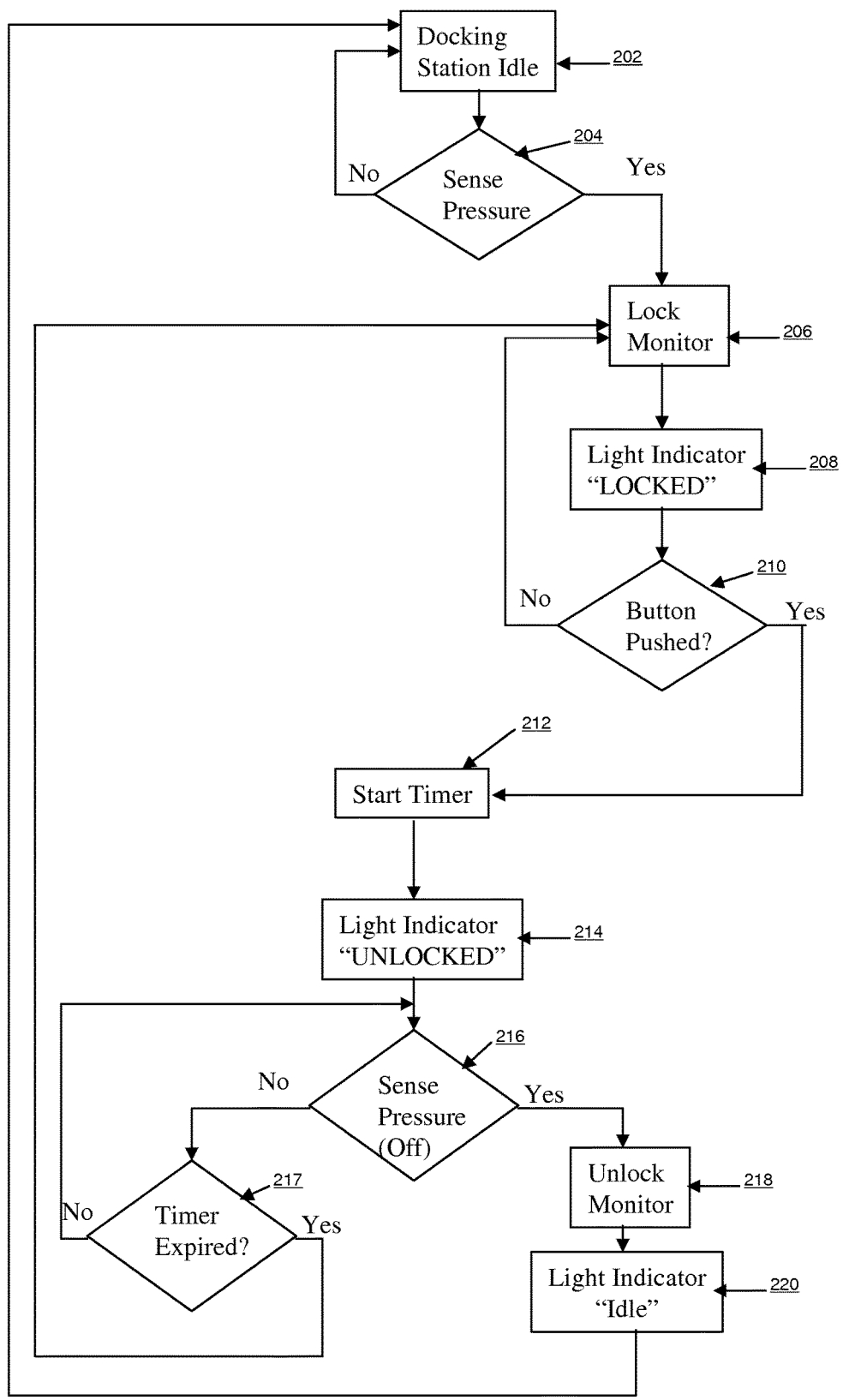
FIGS. 2A & 2B are flow diagrams detailing exemplary operation of the electronic locking mechanism according to invention principles.

FIG. 2A is a flow diagram detailing an exemplary operation of the docking station including the electronic locking mechanism according to invention principles. The operation will be described using the reference numerals associated with the various components discussed above with respect to FIG. 1. Operation begins at block 202 which indicates that the docking station 10 is idle and may selectively receive a patient monitoring device 15. At block 202, the first locking stage as discussed above with respect to FIG. 1 is initiated resulting in the patient monitoring device to be partially mechanically secured to the docking station 10. Thereafter, the operation described with respect to blocks 204-208 occur during the second locking stage as discussed above with respect to FIG. 1. The position sensor 60 senses an amount of force exerted on the docking station in block 204 and provides the sensed data to the microprocessor 40. If there is no force being exerted on the presence sensor, the process reverts to block 202. If the position sensor 60, in block 204, senses a force exerted on the docking station 10, the sensed data is provided to the microprocessor 40 for evaluation thereof. The microprocessor 40 may compare the force sensed by the presence sensor to a threshold and, upon one of reaching or exceeding a predetermined threshold, the microprocessor 40 determines that a patient monitoring device 15 has been docked. The microprocessor 40, in block 206, engages the locking mechanism 34 and establishes a connection enabling communication between the patient monitoring device 15 and docking station 10. The microprocessor 40 further controls the indicator 70 to display a second type of indicator representing the locking mechanism 34 is in the locked state as shown in block 208.

The microprocessor 40 determines, in block 210, whether the state change button 80 on the housing 20 has been activated (or if the microprocessor 40 has received a state change signal from the patient monitoring device) indicating a desire by a user to unlock and undock the patient monitoring device 15 from the docking station 10. If the state change button 80 is not activated, the process reverts back to block 206 and the locking mechanism 34 is maintained in a locked state. If the result of the query in block 210 is positive, the microprocessor 40 initiates the timer 43 in block 212. The timer provides a predetermined amount of time for a user who actually desires to unlock and undock the patient monitoring device 15 to do so. In response to initiating the timer in block 212, the microprocessor 40 in block 214 may control the indicator to display the first indicator indicating the locking mechanism is in an the unlocked state. Alternatively, the microprocessor 40 may also cause the first indicator to display another indicator identifying that the locking mechanism is "idle". In this alternative context, the indicator indicating an "idle" state means that the patient monitoring device is only partially secured using the mechanical lock described above.

The sensor 60 senses the downward force exerted on the docking station 10 after the timer 43 has been initiated in block 216. The microprocessor 40 compares the sensed force after initiation of the timer with the force exerted on the docking station 10 detected in block 204. If the comparison in block 216 results in a determination that there is no change in pressure being exerted on the position sensor 60 (or housing), the microprocessor 40 determines if the timer 43 has expired in block 217. The comparison in block 216 is similar to the one performed in block 204 whereby the microprocessor 40 compares a pressure sensed by the position sensor 60 with a threshold. In one instance, the threshold may be automatically set by a user. In another instance, the threshold may be dynamically set to the pressure value sensed by the position sensor and associated with the weight of the patient monitoring device positioned on the docking station. If the determination in block 217 is negative indicating that the predetermined time period has not yet expired, the process reverts back to block 216 to see if there is to be a reduction in pressure during the predetermined time period. If the determination in block 217 is positive (this could occur, for instance, if the user actually had no desire to unlock and undock the patient monitoring device 15 or changed his mind), then the process reverts back to block 206 and the microprocessor 40 maintains the locking mechanism 34 in a locked state.

If the determination in block 216 is positive indicating that the amount of force being exerted on the position sensor 60 during the predetermined time period is less than the amount of force exerted on the presence sensor as detected in block 204, the microprocessor 40 determines that patient monitoring device 15 is to be unlocked in block 218 allowing removal of the patient monitoring device 15 using a single handed operation. The determination in block 216 is made by comparing a sensed pressure value at the given time with the threshold pressure value as discussed above. If the sensed pressure at the given time is lower than the threshold pressure value, this indicates that a user is attempting to move the patient monitoring device in a direction away from the docking station (e.g. moving the monitor in an upward motion for a top loading docking station or any other movement of the patient monitoring device in a direction away from the docking station). Once unlocked and undocked, the microprocessor 40 causes the indicator to provide an indication representing that the docking station is in the idle position and the process reverts back to block 202 wherein the docking station 10 may await receipt of another patient monitoring device 15 or a return of the same patient monitoring device which has just been removed.

Figure 2B:
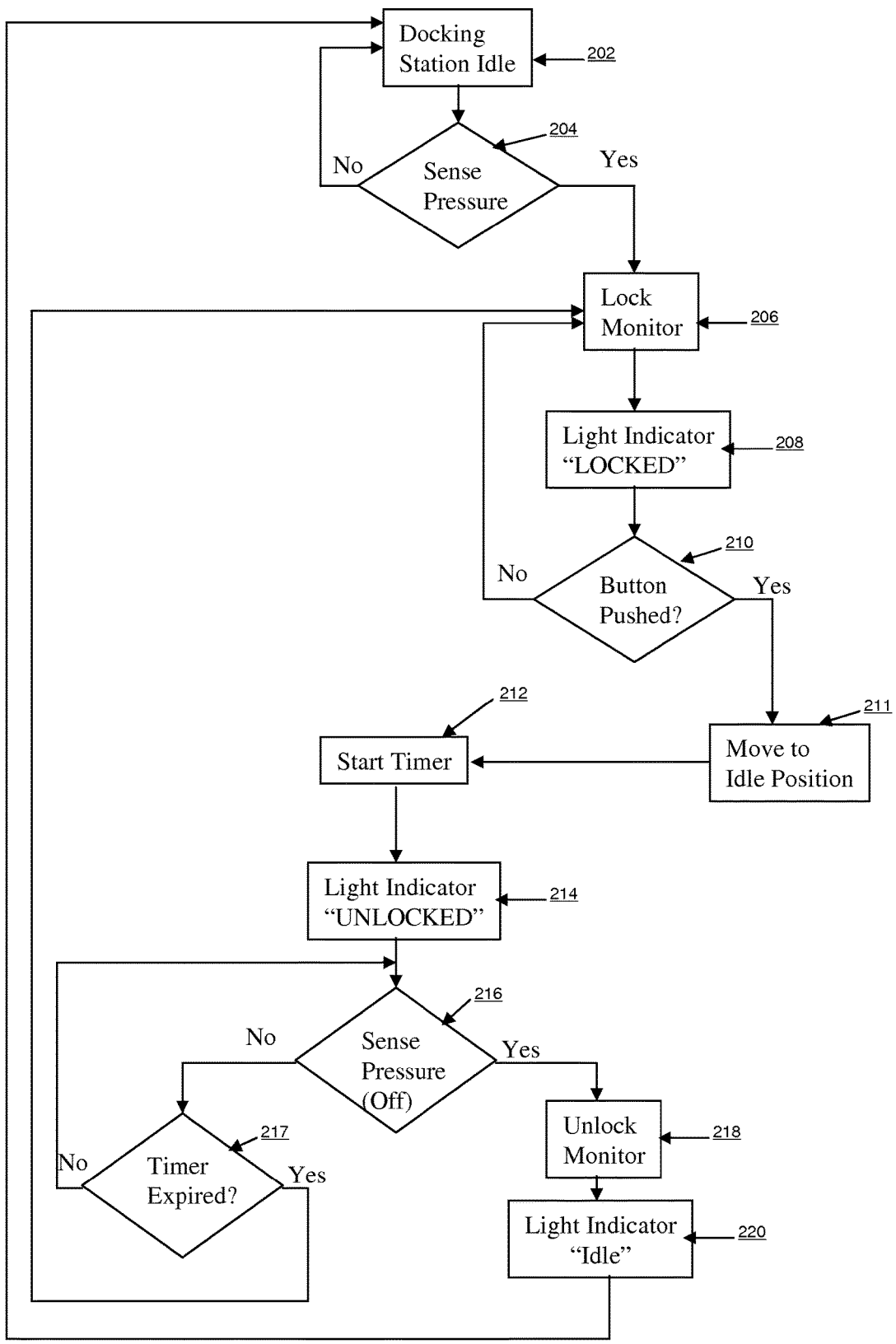

FIG. 2B represents a flow diagram detailing an alternative mode of the docking station including the electronic locking mechanism according to invention principles. FIG. 2B includes many of the same blocks as discussed above with respect to FIG. 2A and these blocks and the components of the docking station that perform these operations are the same as those discussed above with respect to FIG. 2A and need not be repeated. The difference in operation as shown in FIG. 2B occurs after block 210 when the state change button 80 is activated. Instead of immediately starting the timer in block 212, an intervening action is performed in block 211. In block 211, in response to detecting that the state change button 80 has been activated (or the microprocessor 40 has received a state change signal from the patient monitoring device connected to the docking station), the locking mechanism is caused to move from the second locked position into the first idle position. Thereafter, the operation continues to block 212 as discussed above in FIG. 2A. The intermediate step in block 211 of moving the locking mechanism from the second locked position into the first idle position and then initiating the timer and sensing if the pressure on the docking station has changed to determine if the docking station is being removed, advantageously results in a reduction of total time required to go from the second locked stage to the third unlocked stage.

An exemplary embodiment of a docking station 300 including the electronic locking mechanism according to invention principles will now be described with respect to FIGS. 3-8. FIGS. 3-8 depict various views of an exemplary docking station that is able to selectively receive at least one type of patient monitoring device and establish a connection enabling data communication therebetween.

Turning to FIG. 3, a front view of the docking station 300 including the electronic locking mechanism is depicted. The docking station 300 includes a housing 302 having a front face 304, a left face 306, right face 308, a top face 309, a bottom face 310 and back face (312 in FIG. 4). The housing 302 includes a first section 320 positioned on substantially the top face 309 of the housing 302. The first section 320 may selectively receive a first type of patient monitoring device thereon. The housing 302 further includes a second section 322 which is positioned beneath the top face 309 and includes the front face 304, left face 306, right face 308, back face (312 in FIG. 4) and bottom face 310. The second section 322 is adapted to selectively receive a second type of patient monitoring device, different from the first type of patient monitoring device therein.

The first section 320 forms the top face 309 of the docking station 300. The first section includes a first port 330 that selectively receives a first type of patient monitoring device. The first port 330 includes an access door 332 that is pivotally connected to the housing 302. The access door 332 provides selective access to an inner portion of the first section 320. Behind the access door, as will be discussed in FIGS. 5-7, is the first connector (560 in FIG. 7) that electrically couples the docking station 300 with the first type of patient monitoring device enabling one of data to be communicated and power to be provided to the first patient monitoring device. The first section 320 further includes openings 333a and 333b. The first section 320 also includes a set of arms 334a and 334b that extend at least partially through respective openings 333a and 333b. The arms 334a and 334b comprise a part of the first locking mechanism that selectively locks the first type of patient monitoring device received by the first port 330. A bias force is applied to the arms 334a and 334b resulting in the arms 334a and 334b extending is a direction away from a vertical midpoint of the docking station 300. The bias force applied to the arms 334a and 334b may be selectively overcome by applying a predetermined amount of opposing force thereto The arms 334a and 334b may be received within a track positioned on a housing of the first type of patient monitoring device. When the first type of patient monitoring device is positioned atop the housing 302, the first type of patient monitoring device applies the opposing bias force on the arms 334a and 334b causing the arms 334a and 334b to move inward towards the vertical midpoint of the housing 302. By causing the arms 334a and 334b to move inward, the patient monitoring device may be seated on the first port 330. While being seated on the first port 330, the housing of the patient monitoring device causes the access door 332 to pivot thereby enabling a connector on the first type of patient monitoring device to be received within the first section 320 of the housing 302. Once the first type of patient monitoring device is seated on the port 330, the locking mechanism enters the first locking stage whereby the bias force is reapplied to the arms 334a and 334b and the arms 334a and 334b are positioned within the track on the patient monitoring device thereby securing the first type of patient monitoring device to the docking station 300.

The second section 322 of the housing 302 is adapted to selectively receive a second different type of patient monitoring device having a different shape associated therewith. The second section 322 includes a second port 339 for receiving the second type of patient monitoring device. The port 339 includes a channel 340 extending horizontally across the front face 304 of the housing 302. The channel 340 includes a first protrusion 342 extending from a top side 341 of the channel 340. The first protrusion 342 is positioned at substantially a center point of the top side 341 of the channel 340. The channel 340 includes a second protrusion 344 extending from a bottom side 343 of the channel 340. The second protrusion 344 is positioned at substantially a center point of the bottom side 343 of the channel 340. The first protrusion 342 and the second protrusion 344 are in substantial vertical alignment with each other. The first protrusion 342 and second protrusion 344 are selectively received within a track on the second type of patient monitoring device and partially secure the second type of patient monitoring device within the channel 340.

The second section 322 further includes a plurality of tabs 348a-348d, collectively referred to using reference numeral 348, that extend into the channel 340 and form the second locking mechanism which secures the second type of patient monitoring device within the channel 340 and to the docking station 300. Each tab has a respective bias force applied thereto and remain extended into the channel 340. This bias force can be selectively overcome by exerting an opposing force thereon. The opposing force results from the insertion of the second patient monitoring into the channel 340. The bias force applied to the tabs 348 is overcome causing the tabs 348 to move within the second section 322 of the housing 302 until the second patient monitoring device is fully received within the channel 340. The second patient monitoring device may include a plurality of indents at positions aligned with each of the tabs 348a-348d. When in proper position, the tabs 348 are caused to extend into corresponding indents on the housing of the second type of patient monitoring device. The second patient monitoring device is seated within the channel 340 when a rear face of the second patient monitoring device contacts the front face 304 of the housing 302. The bias force is reapplied to the tabs 348 which are secured in the indents of the second patient monitoring device thereby locking the patient monitoring device to the docking station.

The front face 304 of the docking station further includes a second connector 346 that, when aligned with a corresponding connector on a back face of the second patient monitoring device enables connection therebetween allowing data transfer to occur between the second patient monitoring device and the docking station 300. As shown herein, the second connector 346 is an electro-optical connector enabling electrical and optical connection between the second patient monitoring device and the docking station. However, this is describe for purposes of example only and the second connector 346 may be any type of connector that enables a signal transfer to occur between the second patient monitoring device and the docking station. The electro-optical connection shown herein enables data transfer between the second patient monitoring device and the docking station and also allows for providing power to the second patient monitoring device.

The front face 304 further includes at least one state change button 350. The state change button 350 allows a user to input a state change request that will automatically unlock one or both of the patient monitoring devices from the docking station and allow either to be removed by the user using only one hand. The specific algorithm and process associated with changing a state of the first locking mechanism or second locking mechanism is described above with respect to FIGS. 1 and 2 and need not be repeated herein. The inclusion of a single state change button 350 is shown for purposes of example only and the docking station may include a state change button to be associated with changing a state of the locking mechanism associated with each of the patient monitoring devices.

Figure 4:
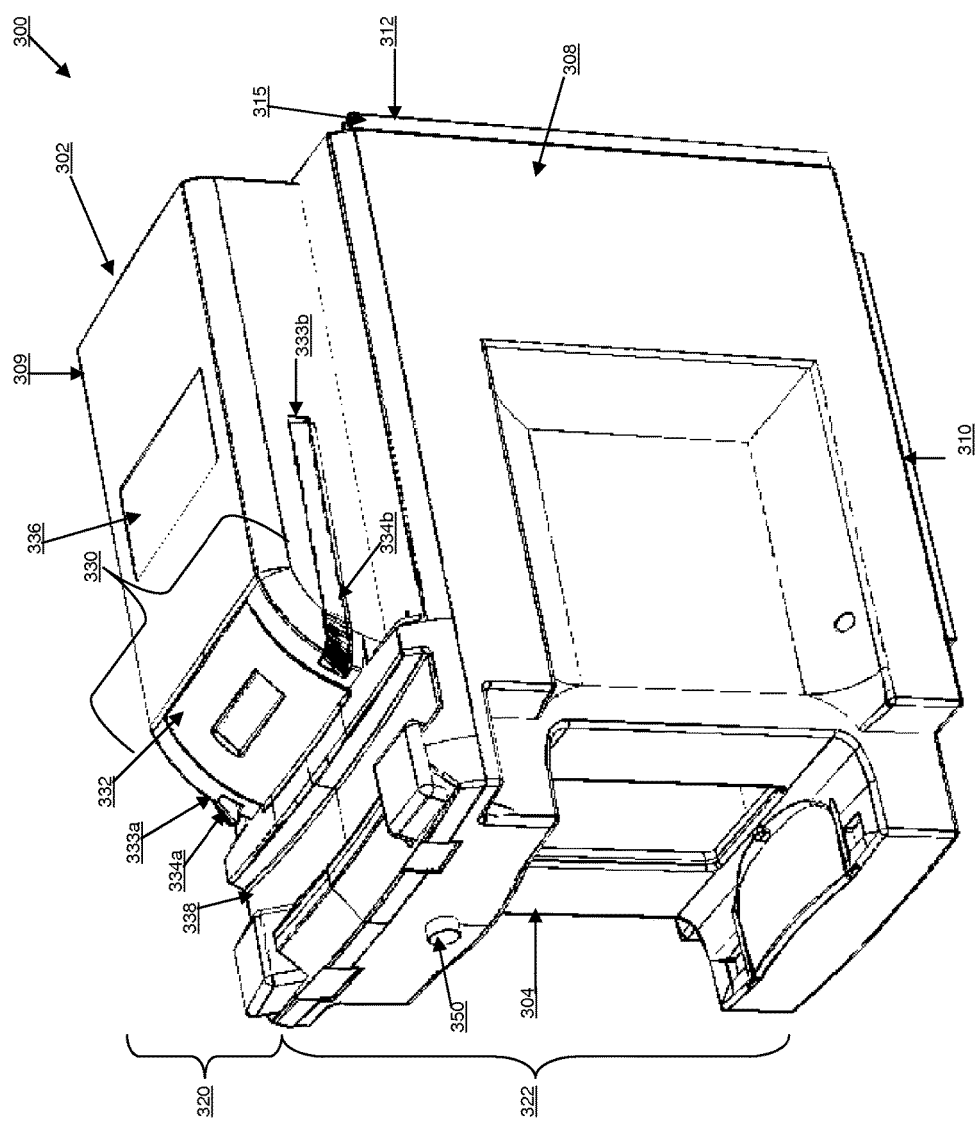
FIG. 4 is a right perspective view of an exemplary docking station including the electronic locking mechanism according to invention principles.

FIG. 4 is a right perspective view of the docking station 300 according to invention principles. This view of the docking station 300 includes many of the same elements described above with respect to FIG. 3, the discussion of which will not be repeated. The right perspective view of the docking station 300 shows the first section 320 and the second section 322. Additionally, FIG. 4 shows a partial side view of the rear face 312 of the housing 302. The rear face of the housing includes a heatsink 315 positioned thereon to enable effective dissipation of heat from the electronic components housed within the housing 302. In one embodiment, the entire rear face 312 of the housing 302 may be formed as a heatsink 315. In another embodiment, only a portion of the rear face 312 of the housing 302 may be formed as the heatsink 315.

The first section 320 includes the top side 309 having a tray 338 that extends along the width thereof. The tray 338 is positioned proximate to the front face 304 of the housing 302. The tray 338 selectively receives a mating lip of a patient monitoring device when the first patient monitoring device is connected to the docking station 300 via the port 330. The top side 309 of the housing 302 further includes the first type of sensor 336. The first type of sensor 336 selectively senses an amount of force exerted on one of the top side 309 of the housing 302. This may including sensing force directly applied to the sensor 336 or force applied and distributed over the housing 302. This advantageously enables the docking station 300 to know when a patient monitoring device is connected to the port 330. Further, as discussed above, by sensing a force exerted on the housing 302, an input signal representative of the sensed force is provided to the microprocessor (40 in FIGS. 1 and 2). The input signal causes the microprocessor to control the locking mechanism to maintain the arms 334a and 334b protruding through respective openings 333a and 333b in a locked position. This advantageously prevents inadvertent removal of the patient monitoring device from the docking station 300.

In operation a first patient monitoring device may be connected to the first section 320. A connection portion on the first type of patient monitoring device conforms to the shape and size of the port 330 of the top side 309. Upon connection to the port 330, a bottom side of the patient monitoring device is positioned against the top side 309 of the housing and is received within the tray 338. Connection of the first type of patient monitoring device to the port 330 causes the access door 332 to pivot downwards towards the bottom face 310 of the docking station 300. The patient monitoring device being seated on the top side 309 of the housing 302 exerts a force against the arms 334a and 334b and overcomes the bias force applied to the arms 334a and 334b. The arms 334a and 334b are caused to move inside of their respective openings 333a and 333b enabling the bottom side of the first type of patient monitoring device to be positioned adjacent to the top face 309 of the housing 302. Once adjacent to the top face 309, the bias force is reapplied to the arms 334a and 334b causing them to re-extend through their respective openings 333a and 333b and into a corresponding track of the patient monitoring device. The reapplication of the bias force to the arms 334a and 334b occurs during the first locking stage.

The first type of sensor 336 senses that a force is being exerted thereon (either directly on the sensor itself or on the top face 309 of the housing 302 in its entirety). The first sensor 336 provides an input signal representative of the sensed force to the microprocessor (40 FIG. 1) which causes the locking mechanism to enter the second locking stage. During the second locking stage, the locking mechanism causes the arms 334a and 334b to be maintained within the track of the patient monitoring device while simultaneously establishing an electrical connection between the first type of patient monitoring device and the docking station 300.

During the process of removing the first type of patient monitoring device from the docking station 300, the state change button 350 is activated and signals the microprocessor to initiate the timer (43 in FIG. 1). This causes the locking mechanism to exit the second locking stage and re-enter the first locking stage. The first type of sensor 336 selectively senses an amount of force exerted thereon and, in response to determination by the microprocessor, that the amount of force has changed (e.g. fallen below a threshold value), the microprocessor determines that a user desires to remove the first type of monitoring device from the docking station 300. In response to this determination, the microprocessor controls the locking mechanism to enter the third unlock stage whereby the arms 334a and 334b are drawn into the housing 302 through their respective openings 333a and 333b. This removes the arms 334a and 334b from the track on the first type of patient monitoring device and enables the first type of patient monitoring device to be easily removed from the top face 309 of the housing 302 using one hand.

FIG. 5 depicts a right side exploded view of the docking station 300 wherein a section of the housing 302 that covers the top face 309 is removed to show a locking mechanism 500. This side view of the docking station 300 includes a hinge 331 which pivotally connects the access door 332 of the port 330. The hinge 331 enables the access door to pivot in a direction towards the bottom face 310 of the docking station 300. Additionally, FIG. 5 depicts certain elements that form the locking mechanism 500 which control the action of the arms 334a and 334b. As this is a right side exploded view, only the right arm 334b is shown. The locking mechanism 500 is positioned within the first section 320 on the top side 309 of the housing. The locking mechanism 500 includes a motor 502. The motor 502 is coupled to a gear 520 selectively causes the gear 520 to rotate about a center point thereof. The gear 520 is at least partially covered with teeth 522 (FIG. 6) along an outer edge thereof. The gear 520 is connected to a lever mechanism 530. Rotation of the gear 520 causes the lever mechanism to move along a linear path in a forward direction towards the front face 304 and in reverse towards the back face 312 of the housing 302. The direction of linear movement of the lever mechanism 530 is represented by the arrow labeled with reference numeral 531. Further specific interaction and operation of the locking mechanism will be discussed below with respect to FIG. 7.

FIG. 5 further shows a respective one of a plurality of second type of sensors 540. The second set of sensors 540 are positioned at predetermined points within the first section 320 to selectively sense a position of a rear edge 532 of the lever mechanism 530 for use in controlling the operation of the motor 502 as was discussed above in FIG. 1 and will be further addressed in FIG. 7.

FIG. 6 depicts a left side exploded view of the docking station 300 wherein a section of the housing 302 that covers the top face 309 is removed to show the locking mechanism 500. This side view of the docking station 300 includes a hinge 331 which pivotally connects the access door 332 of the port 330. The hinge 331 enables the access door to pivot in a direction towards the bottom face 310 of the docking station 300.

The motor 502 includes an axle 504 having threads 506 etched thereon. The axle 504 may be substantially cylindrical in shape. The motor 502 selectively drives the axle 504 to rotate in response to motor control signals received from a microprocessor as discussed above in FIGS. 1 and 2. The threads 506 are etched (or processed) into the surface of the axle 504 and extend around the circumference thereof. The threads 506 of the axle 504 engage with a set of teeth 522 of the gear 520. Thus, the locking mechanism 500 may operate as a caterpillar motor or worm drive. Further, as shown herein, the gear 520 is connected to the lever mechanism 530 by a pin 534. The pin 534 extends from an underside of the lever mechanism 530 in a direction towards the bottom face 310 of the housing 302 and connects to the gear 520 through a slot (524 in FIG. 7).

In response to rotation of the axle 504 by the motor 502, the threads 506 rotate and interact with the teeth 522 on the gear 520. Depending on the direction of the axial rotation, the gear 520 is caused to rotate in one of a clockwise direction or a counterclockwise direction. When the gear 520 is moved in the clockwise direction, the pin 534 causes the lever mechanism 530 to move in a forward direction towards the front face 304 of the housing 302 as illustrated by the directional arrow labeled with reference numeral 601. This movement occurs during the second locking stage and results in the arms 334a (and 334b) being maintained in an extended position. This represents moving between a first idle position and the second locked position. When the motor 502 rotates the axle 504 in the opposite direction, the gear 520 rotates in the counterclockwise direction. The slot 524 on the gear 520 engages the pin 534 and causes the lever mechanism 530 to move in a reverse direction towards the back face 312 of the housing 302 (indicated by the directional arrow labeled with reference numeral 603). This causes the lever mechanism 530 to move from the second locked position back into the first idle position. Additionally, based on the type of motor control signal generated, the axle 504 may continue to rotate in the same direction causing the gear 520 to continue rotating in the counterclockwise direction. The continued counterclockwise rotation causes the lever mechanism 530 to move from the first idle position into the third unlocked position. In the third unlocked position, the first type of patient monitoring device may be removed from the docking station using one hand.

FIG. 7 is a top cross-sectional view of the docking station taken along the line labeled 7-7 in FIG. 3. The top face 309 including the components of the locking mechanism 500. The locking mechanism 500 includes the motor 502 having an axle 504 extending laterally therefrom. The motor 502 is positioned proximate to the right side 308 of the housing and the axle 504 extends outward in a direction towards the left side of the housing 306. The axle 504 includes threads 506.

The locking mechanism 500 further includes a gear 520 that is selectively rotatable about a central axis 521. The gear 520 includes a plurality of teeth 522 extending at least partially along an outer edge thereof. As shown herein, only a portion of the outer edge of the gear 520 includes the teeth 522. However, this is shown for purpose of example only and the teeth 522 may extend entirely along the outer edge of the gear 520. The gear 520 further includes the slot 524 extending therethrough. The slot 524 may be curvilinear in shape and be able to receive a pin 534 therethrough such that the pin 534 may move along a length of the slot 524.

The pin 534 extends from the lever mechanism 530 and through the slot 524 of the gear 520. The pin 534 is vertically aligned with the central axis 521 such that they are in a straight line and are parallel with the motion of the lever mechanism 530. The arms 334a and 334b are also connected to the lever mechanism 530 via flanges 552a and 552b, respectively. The connection between the flanges 552a and 552b and respective arms 334a and 334b forms substantially a right angle therebetween. A biasing member 554 extends between the left arm 334a and the right arm 334b and exerts a bias force on each of the left arm 334a and right arm 334b. The exertion of the bias force by the biasing member 554 maintains the arms 334a and 334b in the first idle position. In the first idle position, the arms 334a and 334b extend partially out from the housing 302 through respective openings 333a and 333b (FIGS. 5 and 6). The biasing member 554 is further connected to the flanges 552a and 552b. The bias force applied to the arms 334a and 334b may be selectively overcome in by applying an opposing force greater than the bias force to the arms 334a and 334b. When overcoming the bias force applied to the arms 334a and 334b, the flanges 552a and 552b move toward one another resulting in the arms 334a and 334b being withdrawn through their respective openings 333a and 333b and into the housing 302. In one embodiment, the biasing member 554 may be implemented as a spring.

Each of the flanges 552a and 552, include at least one flange slot 556. The at least one flange slot 556 extends at least partially through and partially along the length of the respective flange 552a,b. Respective lock pins 558 extend from an underside of the lever mechanism 530 and are received within a respective flange slot 556. When the lock pins 558 are positioned adjacent to an edge of the flange slot 524 proximate to the back face 312 of the housing 302, the locking mechanism 500 is in the first idle position and the flanges 552a and 552b may be caused to move toward one another by overcoming the bias force applied by the biasing member 554 to the arms 334a, 334b. When the lock pins 558 are positioned within the slot 556 proximate the front face 304 of the housing 302, the locking mechanism 500 is in the second locked position and the pins 558 prevent movement of the flanges 552a and 552b. This maintains the bias force applied to the arms 334a and 334b. A connector 560 is also connected to a top side of the lever mechanism 530. The connector 560 enables an electrical connection between the docking station 300 and the patient monitoring device positioned thereon. The electrical connector 560 allows for at least one of data transfer between the docking station and the patient monitoring device and power to be provided from the docking station to the patient monitoring device.

The locking mechanism 500 further includes the second set of sensors collectively referred to by reference numeral 540. The second set of sensors 540 are positional sensors (e.g. optical sensors) and selectively sense a position of a rear edge 532 of the lever mechanism 530. By sensing the position of the rear edge 532 of the lever mechanism 530, positional feedback is provided which advantageously provides the position and state of the locking mechanism 500 (e.g. idle, locked or unlocked). The second set of sensors 540 include a first positional sensor 542 that is positioned between a second positional sensor 544 and a third positional sensor 546. When the respective sensor 542, 544, 546 senses that the rear edge 532 is substantially aligned therewith, the respective sensor provides a control signal to the microprocessor. The microprocessor may use this control signal to control the operation of the motor 502. As shown herein, the rear edge 532 of the lever mechanism 530 is substantially aligned with the first sensor 542 thus indicating that the locking mechanism is in the first idle position. In response to the lever mechanism 530 moving forward towards the front face 304 of the housing 302, the second sensor 544 detects when the rear edge 532 is substantially aligned therewith indicating that the locking mechanism 500 is in the second locked position. In response to the lever mechanism 530 moving backwards towards the back face 312 of the housing 302, the third sensor 546 detects when the rear edge 532 is substantially aligned therewith indicating that the locking mechanism 500 is in the third unlocked position. At each point of detection by one of the second set of sensors 540, the microprocessor generates a stop signal causing the motor 502 to cease operating.

Operation of the locking mechanism 500 will now be described with respect to the components shown in FIG. 7. The locking mechanism 500, as shown herein, is in the first idle position. In the first idle position, the first locking stage has been completed and the bias force applied to the arms 334a and 334b causes the arms to be seated within the track of a corresponding patient monitoring device. In response to sensing that the patient monitoring device is present, for example, by sensing a pressure applied by the patient monitoring device to the housing 302, a microprocessor (FIG. 1) may generate a motor control signal indicating that the locking mechanism should enter the second locking stage and move from the first idle position to the second locked position. The motor control signal controls the motor 502 to rotate the axle 504 in one of a clockwise or counterclockwise direction. The threads 506 on the axle 504 rotate and interact with the teeth 522 on the gear 520. This interaction causes the gear 520 to rotate in a counterclockwise direction indicated by the arrows labeled "B". This rotation causes the lever mechanism 530 to move in a forward direction indicated by the arrow labeled 536 towards the front face 304 of the housing 302. The locking pins 558 move within their respective flange slots 556 and lock the flanges 552a and 552b in place thereby preventing any movement of the flanges 552a and 552b in any direction. Simultaneously, the connector 560 is caused to move in the forward direction 536 and establish a connection between the docking station 300 and a mating connector on the patient monitoring device. This connection enables one of data transfer between the docking station and the patient monitoring device as well as providing power to the patient monitoring device. The pins 558 are locked in place when the rear edge 532 of the lever mechanism is substantially aligned with the second sensor 544. The second sensor 544 signals the microprocessor to stop the motor 502 prevent any further forward movement by the lever mechanism 530.

When a user wishes disconnect the first patient monitoring device from the docking station 300, a state change button 350 is activated. Activation of the state change button initiates a timed period wherein the microprocessor detects, using the first sensor (336 in FIG. 4), whether an amount of force being applied to the housing 302 has been reduced. A sensed reduction in force applied by the patient monitoring device to the housing 302 is indicative of an intentional desire to disconnect the patient monitoring device from the docking station 300. The microprocessor generates a motor control signal that selectively controls the motor 502 to rotate the axle 504 in an opposite direction. The threads 506 engage the teeth 522 of the gear causing the gear 520 to rotate in the clockwise direction as indicated by the arrows labeled "A". The slot 524 causes the pin 534 to be moved in a backward direction indicated by the directional arrow labeled 538 and moves the lever mechanism 530 in the backward direction 538. Movement of the lever mechanism 530 in a backward direction causes the locking pins 558 to contact a rear section of the flange slots 556. By contacting the rear section of the flange slots 556, the pins 558 cause the flanges 552a and 552b to overcome the bias force applied to the arms 334a and 334b by the biasing member 554 and move the flanges 552a and 552b in a direction towards one another. Moving the flanges 552a and 552b towards one another causes the arms 334a and 334b to be withdrawn into the housing 302 through the respective openings 333a and 333b (FIGS. 3 and 4). The backward movement of the lever mechanism 530 and subsequent movement of the flanges 552a and 552b toward one another results in the rear edge 532 of the lever mechanism 530 being substantially aligned with the third sensor 546. Alignment with the third sensor 546 indicates that the locking mechanism is in the third unlock state thereby enabling any patient monitoring device connected thereto to be removed using a one-handed operation.

It will be understood that each of the elements described above, or two or more together may also find a useful application in other types of devices differing from the type described above.

While certain novel features have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit and scope of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:
1. A docking station for a patient monitoring device comprising:
   a housing that is arranged to selectively support a patient monitoring device thereon;
   a first port positioned on the housing for receiving the patient monitoring device therein;
   a sensor that is arranged to sense one of a presence and absence of the patient monitoring device;

an electronic locking mechanism that is arranged to mechanically lock the patient monitoring device to the first port and including a first locking stage and a second locking stage, wherein, in the first locking stage, the electronic locking mechanism secures the docking station and patient monitoring device in a mechanically locked state, and wherein, in the second locking stage, in response to sensing the presence of the patient monitoring device within the first port, the electronic locking mechanism is electronically controlled to maintain the mechanically locked state, a bidirectional transfer of data between the patient monitoring device and the docking station is established, and power is transferred from the docking station to the patient monitoring device.

2. The docking station according to claim 1, further comprising a connector positioned within the first port that is arranged to mate with a corresponding patient monitoring device connector enabling the patient monitoring device to receive power from the docking station and communicate data between the docking station and the patient monitoring device when the electronic locking mechanism locks the patient monitoring device within the first port.

3. The docking station according to claim 2, further comprising an unlock signal generator arranged to cause the electronic locking mechanism to partially disengage the electronic locking mechanism from the patient monitoring device in response to user activation thereof.

4. The docking station according to claim 3, wherein the docking station is arranged such that upon activation of the unlock signal generator and sensing a change in presence of the patient monitoring device by the sensor, the connector is disconnected from the mating connector in the patient monitoring device and the electronic locking mechanism is fully disengaged from the patient monitoring device thereby enabling removal of the patient monitoring device from the docking station by a user.

5. The docking station according to claim 3, further comprising:
a second sensor that is arranged to sense a position of the electronic locking mechanism; and
a controller coupled to the connector, sensor and electronic locking mechanism, the controller arranged to control operation of the electronic locking mechanism and the connector in response to receipt of an input signal from the sensor and from the second sensor.

6. The docking station according to claim 5, wherein the controller is arranged to simultaneously control the electronic locking mechanism to secure the mechanical lock and connect the connector to the mating patient monitoring device connector in response to receiving the input signal from the sensor indicating the presence of the patient monitoring device within the first port.

7. The docking station according to claim 5, wherein the controller is arranged to control the electronic locking mechanism to partially disengage the mechanical lock in response to receiving an unlock signal from the unlock signal generator.

8. The docking station according to claim 7, wherein the controller is arranged to, in response to receiving the unlock signal, initiate a timer for a predetermined time period to determine if the sensor has sensed a change in position of the patient monitoring device within the first port.

9. The docking station according to claim 8, wherein the controller is arranged to fully disengage the electronic locking mechanism and disconnects the connector when the sensor senses a change in position of the patient monitoring device during the predetermined time period.

10. The docking station according to claim 5, wherein the controller is arranged to automatically re-engage the electronic locking mechanism at the conclusion of a predetermined time period if the sensor has not sensed a change in position.

11. The docking station according to claim 1, wherein the electronic locking mechanism is an electromechanical locking mechanism.

12. The docking station according to claim 1, wherein the connector includes at least one of (a) a pin connector; (b) an optical connector and (c) a magnetic connector.

13. The docking station according to claim 1, wherein the sensor is at least one of (a) a pressure sensor; (b) an electronic sensor and (c) an optical sensor.

14. The docking station according to claim 1, wherein the sensor is positioned at least one of (a) within the first port; (b) adjacent the first port; (c) on a side of the housing that contacts the patient monitoring device.

15. A method of securing a patient monitoring device within a docking station comprising:
receiving a patient monitoring device within a first port on a housing of the docking station;
sensing, by a sensor, one of a presence and absence of the patient monitoring device;
in a first locking stage, mechanically locking the patient monitoring device within the first port using an electronic locking mechanism; and
in a second locking stage, maintaining the docking station and patient monitoring device in a mechanically locked state in response to sensing the presence of the patient monitoring device within the first port and enabling a bidirectional transfer of data between the patient monitoring device and the docking station and a transfer of power from the docking station to the patient monitoring device.

16. The method according to claim 15, further comprising connecting a connector positioned within the first port to a corresponding patient monitoring device connector enabling the patient monitoring device to receive power from the docking station and communicate data between the docking station and the patient monitoring device when the electronic locking mechanism locks the patient monitoring device within the first port.

17. The method according to claim 16, further comprising partially disengaging the mechanical lock of the electronic locking mechanism from the patient monitoring device in response to user activation of an unlock signal generator.

18. The method according to claim 17, wherein upon activation of the unlock signal generator and sensing a change in presence of the patient monitoring device by the sensor, further comprising:
disconnecting the connector from the mating patient monitoring device connector;
fully disengaging the electronic locking mechanism from the patient monitoring device thereby enabling removal of the patient monitoring device from the docking station by the user.

19. The method according to claim 17, further comprising controlling, by a controller coupled to the electronic locking mechanism, connector and sensor, operation of the electronic locking mechanism and the connector in response to receipt of an input signal from the sensor and from a second sensor forming part of the docking station that sense a position of the electronic locking mechanism.

20. The method according to claim 19, further comprising simultaneously controlling the electronic locking mechanism to secure the mechanical lock and connecting the connector to the mating patient monitoring device connector in response to receiving input signal from the sensor indicating the presence of the patient monitoring device within the first port.

21. The method according to claim 17, further comprising controlling the electronic locking mechanism to partially disengage the mechanical lock in response to receiving an unlock signal from the unlock signal generator.

22. The method according to claim 21, further comprising initiating, in response to receiving the unlock signal, a timer for a predetermined time period to determine if the sensor has sensed a change in position of the patient monitoring device within the first port.

23. The method according to claim 22, further comprising fully disengaging the electronic locking mechanism and disconnecting the connector when the sensor senses a change in position of the patient monitoring device during the predetermined time period.

24. The method according to claim 21, further comprising automatically re-engaging the electronic locking mechanism at the conclusion of a predetermined time period if the sensor has not sensed a change in position.

25. A docking station for a patient monitoring device comprising:
   a housing that selectively supports a patient monitoring device thereon;
   a first port positioned on the housing for receiving the patient monitoring device therein;
   a sensor that senses one of a presence and absence of the patient monitoring device;
   a locking mechanism that mechanically locks the patient monitoring device to the first port;
   a connector positioned within the first port that mates with a corresponding patient monitoring device connector enabling the patient monitoring device to receive power from the docking station and communicate data between the docking station and the patient monitoring device when the locking mechanism locks the patient monitoring device within the first port;
   an unlock signal generator that causes the locking mechanism to partially disengage the locking mechanism from the patient monitoring device in response to user activation thereof; and
   a controller coupled to the connector, sensor and locking mechanism, the controller controls operation of the locking mechanism and the connector in response to receipt of an input signal from the sensor,
   wherein:
      the locking mechanism maintains the docking station and patient monitoring device in a mechanically locked state in response to sensing the presence of the patient monitoring device within the first port, and
      the controller simultaneously controls the locking mechanism to secure the mechanical lock and connect the connector to the mating patient monitoring device connector in response to receiving the input signal from the sensor indicating the presence of the patient monitoring device within the first port.

26. A docking station for a patient monitoring device comprising:
   a housing that selectively supports a patient monitoring device thereon;
   a first port positioned on the housing for receiving the patient monitoring device therein;
   a sensor that senses one of a presence and absence of the patient monitoring device;
   a locking mechanism that mechanically locks the patient monitoring device to the first port;
   a connector positioned within the first port that mates with a corresponding patient monitoring device connector enabling the patient monitoring device to receive power from the docking station and communicate data between the docking station and the patient monitoring device when the locking mechanism locks the patient monitoring device within the first port;
   an unlock signal generator that causes the locking mechanism to partially disengage the locking mechanism from the patient monitoring device in response to user activation thereof; and
   a controller coupled to the connector, sensor and locking mechanism, the controller controls operation of the locking mechanism and the connector in response to receipt of an input signal from the sensor,
   wherein:
      the locking mechanism maintains the docking station and patient monitoring device in a mechanically locked state in response to sensing the presence of the patient monitoring device within the first port, and
      the controller controls the locking mechanism to partially disengage the mechanical lock in response to receiving an unlock signal from the unlock signal generator and initiates a timer for a predetermined time period to determine if the sensor has sensed a change in position of the patient monitoring device within the first port.

27. The docking station according to claim 26, wherein the controller fully disengages the locking mechanism and disconnects the connector when the sensor senses a change in position of the patient monitoring device during the predetermined time period.

28. A docking station for a patient monitoring device comprising:
   a housing that selectively supports a patient monitoring device thereon;
   a first port positioned on the housing for receiving the patient monitoring device therein;
   a sensor that senses one of a presence and absence of the patient monitoring device;
   a locking mechanism that mechanically locks the patient monitoring device to the first port;
   a connector positioned within the first port that mates with a corresponding patient monitoring device connector enabling the patient monitoring device to receive power from the docking station and communicate data between the docking station and the patient monitoring device when the locking mechanism locks the patient monitoring device within the first port;
   an unlock signal generator that causes the locking mechanism to partially disengage the locking mechanism from the patient monitoring device in response to user activation thereof; and
   a controller coupled to the connector, sensor and locking mechanism, the controller controls operation of the locking mechanism and the connector in response to receipt of an input signal from the sensor,
   wherein:
      the locking mechanism maintains the docking station and patient monitoring device in a mechanically locked state in response to sensing the presence of the patient monitoring device within the first port, and the controller automatically re-engages the locking mechanism at the conclusion of a predetermined time period if the sensor has not sensed a change in position.

29. A method of securing a patient monitoring device within a docking station comprising the activities of receiving a patient monitoring device within a first port on a housing of the docking station;

sensing, by a sensor, one of a presence and absence of the patient monitoring device;

mechanically locking the patient monitoring device within the first port using a locking mechanism;

maintaining the docking station and patient monitoring device in a mechanically locked state in response to sensing the presence of the patient monitoring device within the first port;

connecting a connector positioned within the first port to a corresponding patient monitoring device connector enabling the patient monitoring device to receive power from the docking station and communicate data between the docking station and the patient monitoring device when the locking mechanism locks the patient monitoring device within the first port;

partially disengaging the mechanical lock of the locking mechanism from the patient monitoring device in response to user activation of an unlock signal generator;

controlling, by a controller coupled to the locking mechanism, connector and sensor, operation of the locking mechanism and the connector in response to receipt of an input signal from the sensor; and simultaneously controlling the locking mechanism to secure the mechanical lock and connecting the connector to the mating patient monitoring device connector in response to receiving input signal from the sensor indicating the presence of the patient monitoring device within the first port.

30. The method according to claim 29, further comprising fully disengaging the locking mechanism and disconnecting the connector when the sensor senses a change in position of the patient monitoring device during the predetermined time period.

31. A method of securing a patient monitoring device within a docking station comprising the activities of receiving a patient monitoring device within a first port on a housing of the docking station;

sensing, by a sensor, one of a presence and absence of the patient monitoring device;

mechanically locking the patient monitoring device within the first port using a locking mechanism;

maintaining the docking station and patient monitoring device in a mechanically locked state in response to sensing the presence of the patient monitoring device within the first port;

connecting a connector positioned within the first port to a corresponding patient monitoring device connector enabling the patient monitoring device to receive power from the docking station and communicate data between the docking station and the patient monitoring device when the locking mechanism locks the patient monitoring device within the first port;

partially disengaging the mechanical lock of the locking mechanism from the patient monitoring device in response to user activation of an unlock signal generator;

controlling the locking mechanism to partially disengage the mechanical lock in response to receiving an unlock signal from the unlock signal generator; and initiating a timer for a predetermined time period to determine if the sensor has sensed a change in position of the patient monitoring device within the first port.

32. A method of securing a patient monitoring device within a docking station comprising the activities of receiving a patient monitoring device within a first port on a housing of the docking station;

sensing, by a sensor, one of a presence and absence of the patient monitoring device;

mechanically locking the patient monitoring device within the first port using a locking mechanism;

maintaining the docking station and patient monitoring device in a mechanically locked state in response to sensing the presence of the patient monitoring device within the first port;

connecting a connector positioned within the first port to a corresponding patient monitoring device connector enabling the patient monitoring device to receive power from the docking station and communicate data between the docking station and the patient monitoring device when the locking mechanism locks the patient monitoring device within the first port;

partially disengaging the mechanical lock of the locking mechanism from the patient monitoring device in response to user activation of an unlock signal generator;

controlling the locking mechanism to partially disengage the mechanical lock in response to receiving an unlock signal from the unlock signal generator; and automatically re-engaging the locking mechanism at the conclusion of a predetermined time period if the sensor has not sensed a change in position.

* * * * *